United States Patent
Kim et al.

(10) Patent No.: US 9,113,482 B2
(45) Date of Patent: Aug. 18, 2015

(54) METHOD AND APPARATUS FOR TRANSMITTING FRAMES IN TALK-AROUND DIRECT COMMUNICATION

(71) Applicant: Electronics and Telecommunications Research Institute, Daejeon (KR)

(72) Inventors: Seokki Kim, Gyeonggi-do (KR); Sung Cheol Chang, Daejeon (KR); Mi Young Yun, Daejeon (KR); Won-Ik Kim, Daejeon (KR); Hyun Lee, Daejeon (KR); Sung Kyung Kim, Daejeon (KR); Chul Sik Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 206 days.

(21) Appl. No.: 13/937,827

(22) Filed: Jul. 9, 2013

(65) Prior Publication Data
US 2014/0016619 A1    Jan. 16, 2014

(30) Foreign Application Priority Data

Jul. 10, 2012   (KR) .................. 10-2012-0075226
Jul. 9, 2013    (KR) .................. 10-2013-0080595

(51) Int. Cl.
*H04W 72/08*   (2009.01)
*H04B 7/26*    (2006.01)
*H04W 56/00*   (2009.01)
*H04W 72/04*   (2009.01)

(52) U.S. Cl.
CPC ........... *H04W 72/082* (2013.01); *H04B 7/2656* (2013.01); *H04W 56/003* (2013.01); *H04W 72/0446* (2013.01)

(58) Field of Classification Search
CPC . H04W 56/00; H04W 56/001; H04W 56/003; H04W 56/004; H04W 72/00; H04W 72/04; H04W 72/044; H04W 72/0446; H04W 72/1278; H04B 7/2656; H04B 7/2678; H04B 7/2643

See application file for complete search history.

(56) References Cited

U.S. PATENT DOCUMENTS

| | | | |
|---|---|---|---|
| 2009/0323628 A1* | 12/2009 | Cho et al. | 370/330 |
| 2014/0233469 A1* | 8/2014 | Seo et al. | 370/329 |
| 2014/0348063 A1* | 11/2014 | Kang et al. | 370/328 |

* cited by examiner

*Primary Examiner* — Anh Ngoc Nguyen
(74) *Attorney, Agent, or Firm* — Rabin & Berdo, P.C.

(57) ABSTRACT

A permutated channel structure based on a block structure in talk-around direct communication is provided. A dedicated subchannel interferes with only one adjacent dedicated subchannel, even with a large synchronization error, by permutating the dedicated subchannels by cyclic shifts, whereby diversity gain can be maintained and interference between adjacent channels can be minimized.

12 Claims, 10 Drawing Sheets

FIG. 3A

| Subframe index | 1 | 2 | 3 | 4 | 5 | 6 | 7 | 8 | 9 | 10 | 11 | 12 |
|---|---|---|---|---|---|---|---|---|---|---|---|---|
| mRB index 1 | | 1 | 1 | | 1 | 1 | 5 | 5 | 5 | | 5 | 5 |
| 2 | | 1 | 1 | | 1 | 1 | 5 | 5 | 5 | | 5 | 5 |
| 3 | | 1 | 1 | | 1 | 1 | 5 | 5 | 6 | | 6 | 6 |
| 4 | | 2 | 2 | | 2 | 2 | 6 | 6 | 6 | | 6 | 6 |
| 5 | | 2 | 2 | | 2 | 2 | 6 | 6 | 6 | | 6 | 7 |
| 6 | Message Part / Preamble Part | 2 | 2 | | 2 | 2 | 7 | 7 | 7 | | 7 | 7 |
| 7 | | 3 | 3 | | 3 | 3 | 7 | 7 | 7 | | 7 | 7 |
| 8 | | 3 | 3 | | 3 | 3 | 7 | 8 | 8 | | 8 | 8 |
| 9 | | 3 | 3 | | 3 | 3 | 8 | 8 | 8 | | 8 | 8 |
| 10 | | 4 | 4 | | 4 | 4 | 8 | 8 | 8 | | 9 | 9 |
| 11 | | 4 | 4 | | 4 | 4 | 9 | 9 | 9 | | 9 | 9 |
| 12 | | 4 | 4 | | 4 | 4 | 9 | 9 | 9 | | 9 | 9 |

Setp 1: temporal assignment

FIG. 3B

| mRB index \ Subframe index | 1 (Message Part) | 1 (Preamble Part) | 2 | 3 | 4 | 5 | 6 | 7 | 8 | 9 | 10 | 11 | 12 |
|---|---|---|---|---|---|---|---|---|---|---|---|---|---|
| 1 | | | 3 | 2 | | 1 | 4 | 5 | 8 | 8 | | 7 | 7 |
| 2 | | | 4 | 3 | | 4 | 1 | 6 | 7 | 9 | | 9 | 6 |
| 3 | | | 2 | 4 | | 2 | 1 | 9 | 6 | 6 | | 8 | 5 |
| 4 | | | 4 | 3 | | 2 | 1 | 5 | 8 | 7 | | 9 | 7 |
| 5 | | | 2 | 1 | | 3 | 2 | 6 | 9 | 7 | | 5 | 5 |
| 6 | | | 4 | 1 | | 1 | 3 | 5 | 6 | 8 | | 5 | 7 |
| 7 | | | 3 | 4 | | 3 | 2 | 7 | 9 | 6 | | 6 | 9 |
| 8 | | | 1 | 4 | | 3 | 4 | 7 | 7 | 5 | | 9 | 8 |
| 9 | | | 2 | 1 | | 2 | 4 | 8 | 5 | 6 | | 7 | 8 |
| 10 | | | 3 | 3 | | 4 | 3 | 8 | 5 | 5 | | 6 | 6 |
| 11 | | | 1 | 2 | | 4 | 2 | 7 | 8 | 9 | | 8 | 9 |
| 12 | | | 1 | 2 | | 1 | 3 | 9 | 5 | 8 | | 6 | 9 |

Setp 2: permutation in the subframe

FIG. 4A

| Subframe index | 1 | 2 | 3 | 4 | 5 | 6 | 7 | 8 | 9 | 10 | 11 | 12 |
|---|---|---|---|---|---|---|---|---|---|---|---|---|
| mRB index 1 | | 1 | 1 | | 1 | 1 | 5 | 5 | 5 | | 5 | 5 |
| 2 | | 1 | 1 | | 1 | 1 | 5 | 5 | 5 | | 5 | 5 |
| 3 | | 1 | 1 | | 1 | 1 | 5 | 5 | 6 | | 6 | 6 |
| 4 | | 2 | 2 | | 2 | 2 | 6 | 6 | 6 | | 6 | 6 |
| 5 | | 2 | 2 | | 2 | 2 | 6 | 6 | 6 | | 6 | 7 |
| 6 | Message Part / Preamble Part | 2 | 2 | | 2 | 2 | 7 | 7 | 7 | | 7 | 7 |
| 7 | | 3 | 3 | | 3 | 3 | 7 | 7 | 7 | | 7 | 7 |
| 8 | | 3 | 3 | | 3 | 3 | 7 | 8 | 8 | | 8 | 8 |
| 9 | | 3 | 3 | | 3 | 3 | 8 | 8 | 8 | | 8 | 8 |
| 10 | | 4 | 4 | | 4 | 4 | 8 | 8 | 8 | | 9 | 9 |
| 11 | | 4 | 4 | | 4 | 4 | 9 | 9 | 9 | | 9 | 9 |
| 12 | | 4 | 4 | | 4 | 4 | 9 | 9 | 9 | | 9 | 9 |

Setp 1: temporal assignment

FIG. 4B

| mRB index \ Subframe index | 1 | 2 | 3 | 4 | 5 | 6 | 7 | 8 | 9 | 10 | 11 | 12 |
|---|---|---|---|---|---|---|---|---|---|---|---|---|
| 1 |  | 3 | 2 |  | 1 | 4 | 5 | 8 | 8 |  | 7 | 7 |
| 2 |  | 4 | 3 |  | 4 | 1 | 6 | 7 | 9 |  | 9 | 6 |
| 3 |  | 2 | 4 |  | 2 | 1 | 9 | 6 | 6 |  | 8 | 5 |
| 4 |  | 4 | 3 |  | 2 | 1 | 5 | 8 | 7 |  | 9 | 7 |
| 5 |  | 2 | 1 |  | 3 | 2 | 6 | 9 | 7 |  | 5 | 5 |
| 6 |  | 4 | 1 |  | 1 | 3 | 5 | 6 | 8 |  | 5 | 7 |
| 7 |  | 3 | 4 |  | 3 | 2 | 7 | 9 | 6 |  | 6 | 9 |
| 8 |  | 1 | 4 |  | 3 | 4 | 7 | 7 | 5 |  | 9 | 8 |
| 9 |  | 2 | 1 |  | 2 | 4 | 8 | 5 | 6 |  | 7 | 8 |
| 10 |  | 3 | 3 |  | 4 | 3 | 8 | 5 | 5 |  | 6 | 6 |
| 11 |  | 1 | 2 |  | 4 | 2 | 7 | 8 | 9 |  | 8 | 9 |
| 12 |  | 1 | 2 |  | 1 | 3 | 9 | 5 | 8 |  | 6 | 9 |

Setp 2: permutation in the subframe

FIG. 5A

| mRB index \ Subframe index | 1 | 2 | 3 | 4 | 5 | 6 | 7 | 8 | 9 | 10 | 11 | 12 |
|---|---|---|---|---|---|---|---|---|---|---|---|---|
| 1 | | 1 | 1 | | 1 | 1 | 5 | 5 | 5 | | 5 | 5 |
| 2 | | 1 | 1 | | 1 | 1 | 5 | 5 | 5 | | 5 | 5 |
| 3 | | 1 | 1 | | 1 | 1 | 5 | 5 | 6 | | 6 | 6 |
| 4 | | 2 | 2 | | 2 | 2 | 6 | 6 | 6 | | 6 | 6 |
| 5 | | 2 | 2 | | 2 | 2 | 6 | 6 | 6 | | 6 | 7 |
| 6 | | 2 | 2 | | 2 | 2 | 7 | 7 | 7 | | 7 | 7 |
| 7 | | 3 | 3 | | 3 | 3 | 7 | 7 | 7 | | 7 | 7 |
| 8 | | 3 | 3 | | 3 | 3 | 7 | 8 | 8 | | 8 | 8 |
| 9 | | 3 | 3 | | 3 | 3 | 8 | 8 | 8 | | 8 | 8 |
| 10 | | 4 | 4 | | 4 | 4 | 8 | 8 | 8 | | 9 | 9 |
| 11 | | 4 | 4 | | 4 | 4 | 9 | 9 | 9 | | 9 | 9 |
| 12 | | 4 | 4 | | 4 | 4 | 9 | 9 | 9 | | 9 | 9 |

Setp 1: temporal assignment

FIG. 5B

| mRB index \ Subframe index | 1 | 2 | 3 | 4 | 5 | 6 | 7 | 8 | 9 | 10 | 11 | 12 |
|---|---|---|---|---|---|---|---|---|---|---|---|---|
| 1 | Message Part / Preamble Part | 4 | 3 | | 1 | 4 | 5 | 9 | 8 | | 6 | 6 |
| 2 | | 4 | 3 | | 1 | 4 | 5 | 9 | 8 | | 7 | 6 |
| 3 | | 4 | 3 | | 1 | 4 | 5 | 5 | 9 | | 7 | 7 |
| 4 | | 1 | 4 | | 2 | 1 | 6 | 5 | 9 | | 8 | 7 |
| 5 | | 1 | 4 | | 2 | 1 | 6 | 5 | 5 | | 8 | 7 |
| 6 | | 1 | 4 | | 2 | 1 | 7 | 6 | 5 | | 9 | 8 |
| 7 | | 2 | 1 | | 3 | 2 | 7 | 6 | 6 | | 9 | 8 |
| 8 | | 2 | 1 | | 3 | 2 | 7 | 7 | 6 | | 9 | 9 |
| 9 | | 2 | 1 | | 3 | 2 | 8 | 7 | 6 | | 5 | 9 |
| 10 | | 3 | 2 | | 4 | 3 | 8 | 8 | 7 | | 5 | 9 |
| 11 | | 3 | 2 | | 4 | 3 | 9 | 8 | 7 | | 6 | 5 |
| 12 | | 3 | 2 | | 4 | 3 | 9 | 8 | 8 | | 6 | 5 |

Setp 2: permutation in the subframe

METHOD AND APPARATUS FOR TRANSMITTING FRAMES IN TALK-AROUND DIRECT COMMUNICATION

CROSS-REFERENCE TO RELATED APPLICATION

This application claims priority to and the benefit of Korean Patent Application No. 10-2012-0075226 and No. 10-2013-0080595 filed in the Korean Intellectual Property Office on Jul. 10, 2012 and on Jul. 9, 2013 respectively, the entire contents of which are incorporated herein by reference.

BACKGROUND OF THE INVENTION (a) Field of the Invention

The present invention relates to frames and a dedicated channel which are used for talk-around direct communication.

(b) Description of the Related Art

IEEE 802.16n can be used to build a reliable wireless network even in emergency situations, based on WiBro technology. One of the key features of IEEE 802.16n is the talk-around direct communication (TDC) feature.

In an IEEE 802.16n system, some of infrastructure communication resources can be assigned to terminals performing direct communication, in order to provide talk-around direct communication. Frames used for talk-around direct communication include resources (channels) assigned in the IEEE 802.16n system, and the resources (channels) include a synchronization channel, a dedicated channel, and a supplementary channel. The dedicated channel may be used for data transmission and reception between terminals. FIG. 1 is a view showing terminals interfering with each other in talk-around direct communication.

However, there are some problems in current permutated dedicated channel structures. If high-reliability mobile stations (HR-MSs) are synchronized by a distributed synchronization method, the HR-MSs may have different timing/frequency offsets.

Also, if the HR-MSs are positioned adjacent to each other, interference may occur due to the difference in power level between the dedicated channels used by the HR-MSs. Referring to FIG. 1, mobile station (MS) a1 is positioned adjacent to MS b1, and therefore cannot use a TDC link (a) due to a TDC link (b) between MS b1 and MS b2.

Accordingly, it is necessary to modify the dedicated channel structure to solve this problem occurring in the prior art.

SUMMARY OF THE INVENTION

The present invention has been made in an effort to provide a permutated channel structure based on a block structure in talk-around direct communication.

An exemplary embodiment of the present invention provides a method for transmitting frames in talk-around direct communication. The method for transmitting frames in talk-around direct communication comprising: assigning a plurality of mini-resource blocks (mRBs) to at least one subframe assigned for a dedicated channel, among a plurality of subframes included in the frames; calculating a number of cyclic shifts based on indices of the subframes and a number of dedicated subchannels included in a slot; cyclically shifting the mRBs according to the number of cyclic shifts; and transmitting frames including a plurality of cyclically shifted mRBs.

Another embodiment of the present invention provides an apparatus for transmitting frames in talk-around direct communication. The apparatus comprising: a block assignment part that assigns a plurality of mini-resource blocks (mRBs) to at least one subframe assigned for a dedicated channel, among a plurality of subframes included in the frames; a shifting part that calculates a number of cyclic shifts based on indices of the subframes and a number of dedicated subchannels included in a slot, and cyclically shifts the mRBs according to the number of cyclic shifts; and a transmitting part that transmits frames including a plurality of cyclically shifted mRBs.

BRIEF DESCRIPTION OF THE DRAWINGS

FIG. 3A and FIG. 3B are views showing a channel structure used for talk-around direct communication.

FIG. 4A and FIG. 4B are views showing interference between channels used for talk-around direct communication.

FIG. 5A and FIG. 5B are views showing a channel structure created by a shift method in accordance with an exemplary embodiment of the present invention.

DETAILED DESCRIPTION OF THE EMBODIMENTS

Figure 1:
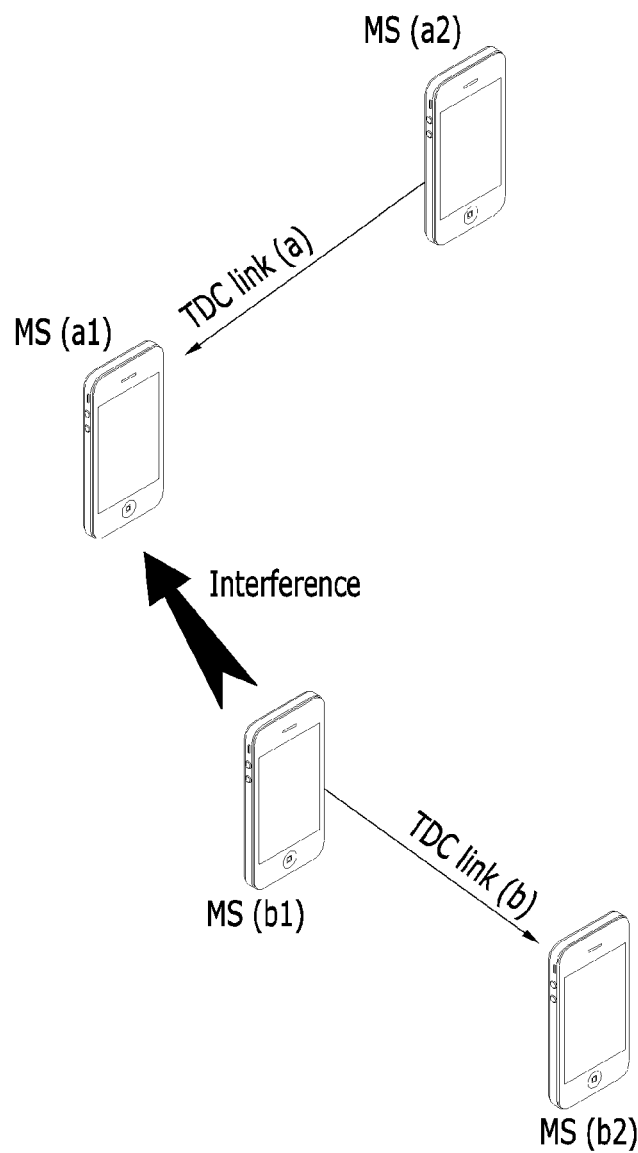
FIG. 1 is a view showing terminals interfering with each other in talk-around direct communication.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. Terms such as "unit", "module", "block", or the like described in the specification may refer to a unit for processing at least one function or operation, which can be implemented by hardware, software, or a combination of hardware and software.

Figure 2:
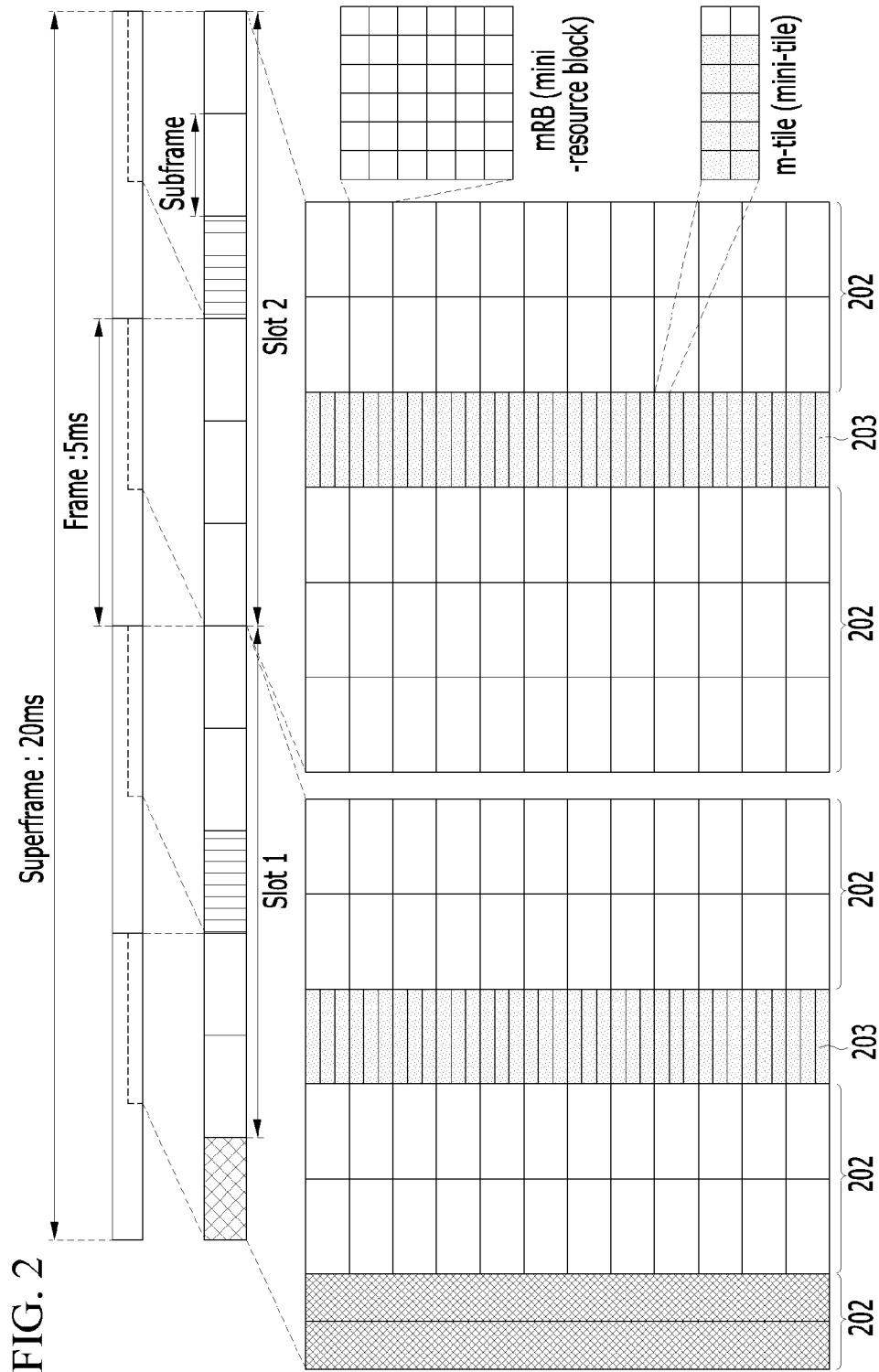
FIG. 2 is a view showing frames used for talk-around direct communication.

FIG. 2 is a view showing frames used for talk-around direct communication.

Referring to FIG. 2, a superframe includes a plurality of frames, and each frame includes a plurality of subframes. Each subframe may be assigned for either a synchronization channel, a dedicated channel, or a supplementary channel. The synchronization channel includes a message part and a preamble part, and the supplementary channel includes mini-tiles (m-tiles). The dedicated channel includes a plurality of dedicated subchannels, and each dedicated subchannel includes a plurality of mini-resource blocks (mRBs).

Referring to FIG. 2, second, third, fifth, and sixth subframes of slot 1 and first, second, third, fifth, and sixth subframes of slot 2 are assigned for a dedicated channel.

FIG. 3A and FIG. 3B are view showing a channel structure used for talk-around direct communication.

Referring to FIG. 3A and FIG. 3B, the first subframe is assigned for a synchronization channel, and the fourth and tenth subframes are assigned for supplementary channels.

Referring to FIG. 3A and FIG. 3B, the second, third, fifth, sixth, seventh, eighth, ninth, eleventh, and twelfth subframes are assigned for a dedicated channel, and the numbers indicated on the mRBs indicate the indices of dedicated subchannels. Referring to FIG. 2, each dedicated subchannel includes 12 mRBs, and 108 mRBs included in the first to ninth dedicated subchannels are distributed in the dedicated channel area.

Conventionally, as shown in FIG. 3A, 9 dedicated subchannels are temporally assigned for the dedicated channel area, based on the time axis, and as shown in FIG. 3B, the dedicated subchannels are randomly permutated to obtain a diversity gain.

FIG. 4A and FIG. 4B are view showing interference between channels used for talk-around direct communication.

However, referring to FIG. 4A and FIG. 4B, random permutation of dedicated subchannels has a high possibility of causing interference between adjacent dedicated subchannels. That is, the channel structure shown in FIG. 4A has a lower possibility of causing interference between dedicated subchannels although it makes it difficult to obtain a diversity gain. On the other hand, the channel structure shown in FIG. 4B has a higher possibility of causing interference between dedicated subchannels although it makes it possible to obtain a diversity gain. For example, interference between the first dedicated subchannel and an adjacent dedicated subchannel might occur up to twelve times. That is, if the dedicated subchannels are randomly distributed, one of these dedicated subchannels interferes with all the other dedicated subchannels present in the frames, thereby rapidly reducing the use of resources. Accordingly, there is a need for a channel structure capable of reducing channel interference while obtaining diversity gain.

FIG. 5A and FIG. 5B are view showing a channel structure created by a shift method in accordance with an exemplary embodiment of the present invention.

In accordance with an exemplary embodiment of the present invention, the duration of a superframe is 20 ms, the superframe includes four frames, and the duration of each frame is 5 ms. Each frame includes three subframes. That is, the number of subframes per frame ($N_{subframe\_per\_frame}$) is 3. Accordingly, the superframe in accordance with the exemplary embodiment of the present invention may include 12 subframes ($4 \times N_{subframe\_per\_frame}$).

Referring to FIG. 5A and FIG. 5B, the shift method in accordance with the exemplary embodiment of the present invention involves distributing dedicated subchannels in a subframe area assigned for a dedicated channel by two steps.

By the first step (FIG. 5A), 12 successive mRBs are assigned to each subframe, based on the time axis. Since the mRBs assigned in the first step will be distributed in the second step, this assignation is temporal. Each subframe to which these mRBs are assigned is a subframe assigned for a dedicated channel.

In this step, 12 successive mRBs may be assigned to at least one of the first to ($4N_{subframe\_per\_frame}$)th subframes of slot 1, and may also be assigned to at least one of the ($2N_{subframe\_per\_frame}+1$)th to ($4N_{subframe\_per\_frame}$)th subframes of slot 2.

Referring to FIG. 5A and FIG. 5B, although slot 1 has six subframes, the first subframe and the fourth subframe are respectively assigned for a synchronization channel and a supplementary channel. Hence, the positions of slot 1 where continuous mRBs can be assigned include the second, third, fifth, and sixth subframes. That is, four dedicated subchannels from the first to fourth may be included in slot 1 ($N_{ded-subchannel,1}=4$). Also, although slot 2 has six subframes, the fourth subframe is assigned for a supplementary channel. Hence, the positions of slot 2 where continuous mRBs can be assigned include the first, second, third, fifth, and sixth subframes. That is, five dedicated subchannels from the fifth to ninth may be included in slot 2 ($N_{ded-subchannel,2}=5$).

By the second step (FIG. 5B), mRBs assigned to each subframe are cyclically shifted.

Number of cyclic shifts = (Equation 1)

$$\mod\left((j-1) \times \text{floor}\left(\frac{12}{N_{ded-subchannel,i}}\right), 12\right)$$

According to Equation 1, $N_{ded-subchannel,1}$ is 4 because four dedicated subchannels are included in slot 1, and $N_{ded-subchannel,2}$ is 5 because five dedicated subchannels are included in slot 2. As a result, the number of cyclic shifts of the second, third, fifth, sixth, seventh, eighth, ninth, eleventh, and twelfth subframes is 3, 6, 0, 3, 0, 2, 4, 8, and 10.

Figure 6:
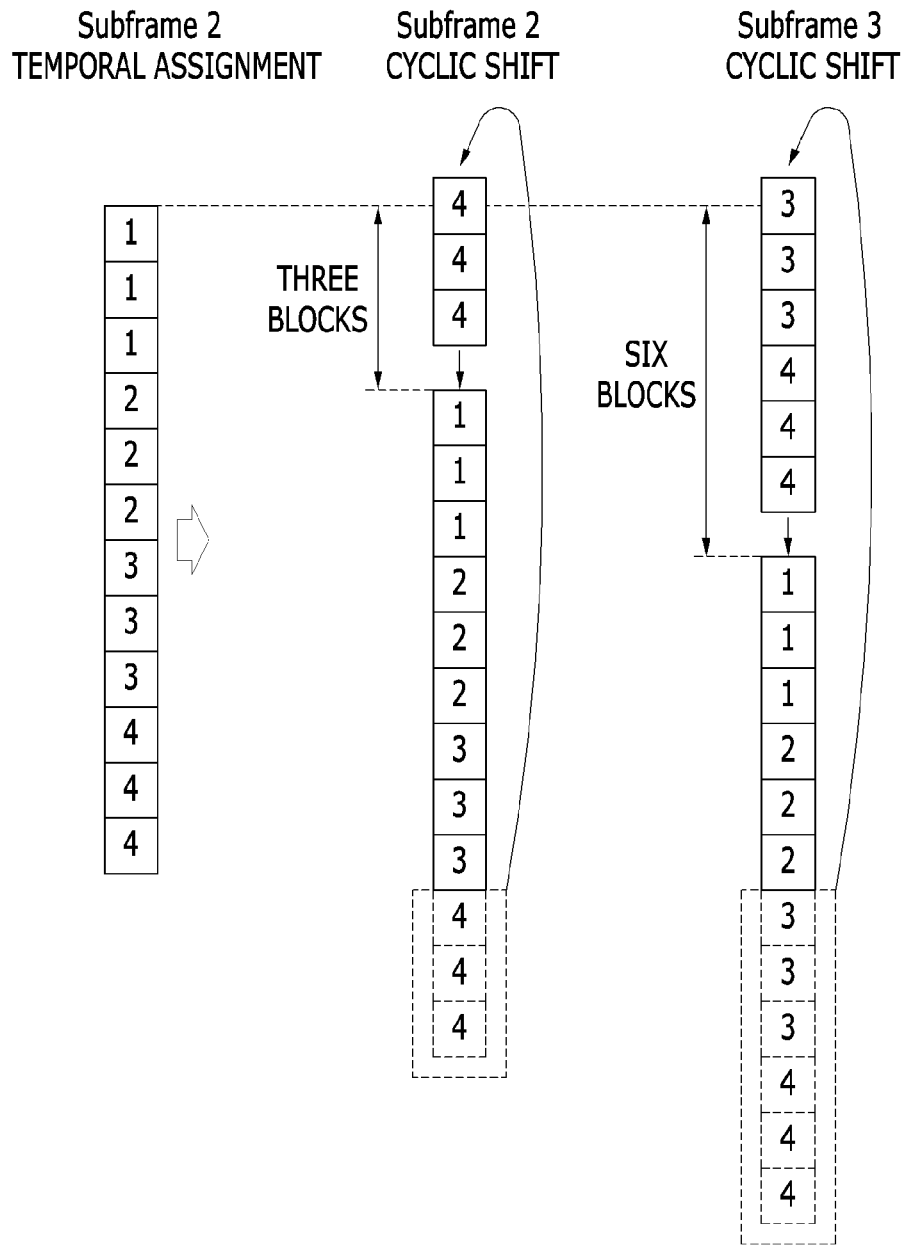
FIG. 6 is a view showing a method of cyclically shifting dedicated subchannels in accordance with an exemplary embodiment of the present invention.

Among these subframes, the second subframe in which the mRBs are cyclically shifted are illustrated in FIG. 6.

FIG. 6 is a view showing a method of cyclically shifting dedicated subchannels in accordance with an exemplary embodiment of the present invention.

Referring to FIG. 6, first of all, dedicated subchannels are temporarily assigned, and then three mRBs for each of the first, second, third, and fourth dedicated subchannels are positioned sequentially in the second subframe.

Next, the number of cyclic shifts of the second subframe is calculated according to Equation 2.

Number of cyclic shifts of second subframe = (Equation 2)

$$\mod\left((2-1) \times \text{floor}\left(\frac{12}{4}\right), 12\right) =$$

$$\mod(1 \times 3, 12) = \mod(3, 12) = 3$$

Because the number of cyclic shifts is 3 according to Equation 2, each mRB is shifted three units down, and the three mRBs of the fourth dedicated subchannel at the bottom are cyclically shifted to the top.

Once dedicated subchannels are temporarily assigned, the dedicated subchannels are in the same positions in the second and third subframes. Thus, if the dedicated subchannels in the third subframe are cyclically shifted, the number of cyclic shifts of the third subframe is calculated according to Equation 3.

Number of cyclic shifts of third subframe = (Equation 3)

$$\mod\left((3-1) \times \text{floor}\left(\frac{12}{4}\right), 12\right) =$$

$$\mod(2 \times 3, 12) = \mod(6, 12) = 6.$$

Because the number of cyclic shifts is 6 according to Equation 2, each mRB is shifted six units down, and the six mRBs of the third and fourth dedicated subchannels at the bottom are cyclically shifted to the top.

FIG. 5B shows the subframes in which the dedicated subchannels are distributed according to the number of cyclic shifts 3, 6, 0, 3, 0, 2, 4, 8, and 10. The temporarily assigned dedicated subchannels remain as is in the fifth and seventh subframes for which the number of cyclic shifts is 0.

By distributing dedicated subchannels in subframes by cyclic shifts and transmitting a frame as set forth above in accordance with an exemplary embodiment of the present invention, a dedicated subchannel interferes with only one adjacent dedicated subchannel even with a large synchronization error, whereby diversity gain can be maintained and interference between adjacent channels can be minimized.

Figure 7:
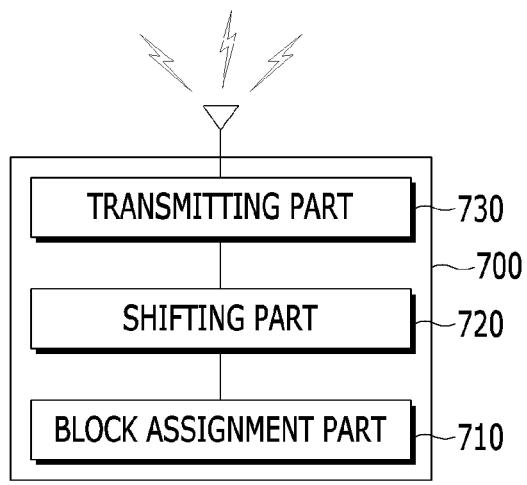
FIG. 7 is a block diagram showing an apparatus for transmitting frames in accordance with an exemplary embodiment of the present invention.

FIG. 7 is a block diagram showing an apparatus for transmitting frames in accordance with an exemplary embodiment of the present invention.

Referring to FIG. 7, a frame transmitting apparatus 700 includes a block assignment part 710, a shifting part 720, and a transmitting part 730. The frame transmitting apparatus 700 of FIG. 7 may be included in a terminal or may be a terminal itself.

The block assignment part 710 allocates 12 successive mRBs to each subframe based on the time axis. Each subframe to which these mRBs are assigned is a subframe assigned for a dedicated channel.

The shifting part 720 calculates a shift value for cyclically shifting mRBs assigned to a subframe. In this case, the shifting part 720 can cyclically shift the mRBs by Equation 1, based on the number ($N_{ded-subchannel,i}$) of dedicated subchannels included in an i-th slot and the index (j) of the subframe.

Afterwards, the transmitting part 730 can transmit a frame in which mRBs are cyclically shifted.

According to an embodiment of the present invention, a dedicated subchannel interferes with only one adjacent dedicated subchannel, even with a large synchronization error, by permutating the dedicated subchannels by cyclic shifts, whereby diversity gain can be maintained and interference between adjacent channels can be minimized.

At least some features of the method and apparatus for transmitting frames according to the above-described exemplary embodiment of the present invention may be implemented in hardware or in software combined with hardware. For example, a processor implemented as a central processing unit (CPU), a chipset, a microprocessor, etc. may function as the block assignment part 710 and the shifting part 720, and a transmitter may function as the transmitting part 730.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting frames in direct communication, the method comprising:
    assigning a plurality of mini-resource blocks (mRBs) to at least one subframe assigned for a dedicated channel, among a plurality of subframes included in the frames;
    calculating a number of cyclic shifts based on indices of the subframes and a number of dedicated subchannels included in a slot;
    cyclically shifting the mRBs according to the number of cyclic shifts; and
    transmitting frames including a plurality of cyclically shifted mRBs.

2. The method of claim 1, wherein the assigning comprises assigning the mRBs to the subframes based on a time axis.

3. The method of claim 1, wherein the assigning comprises assigning 12 successive mRBs to the subframes.

4. The method of claim 3, wherein the calculating of the number of cyclic shifts comprises:
    calculating a floor function of a value obtained by dividing 12 by the number of dedicated subchannels included in the slot; and
    multiplying an index minus 1 by the floor function, dividing the resultant value by 12, and leaving the remainder as the number of cyclic shifts.

5. The method of claim 1, wherein the dedicated channel comprises a plurality of dedicated subchannels, the dedicated subchannels comprise a plurality of mRBs, and
    some mRBs included in some of the dedicated subchannels are assigned for the subframes.

6. The method of claim 1, wherein the frames are included in a superframe, and
    the superframe comprises a first slot and a second slot, the first slot comprises four dedicated subchannels, and the second slot comprises five dedicated subchannels.

7. An apparatus for transmitting frames in direct communication, the apparatus comprising:
    a block assignment part that assigns a plurality of mini-resource blocks (mRBs) to at least one subframe assigned for a dedicated channel, among a plurality of subframes included in the frames;
    a shifting part that calculates a number of cyclic shifts based on indices of the subframes and a number of dedicated subchannels included in a slot, and cyclically shifts the mRBs according to the number of cyclic shifts; and
    a transmitting part that transmits frames including a plurality of cyclically shifted mRBs.

8. The apparatus of claim 7, wherein the block assignment part assigns the mRBs to the subframes based on the time axis.

9. The apparatus of claim 7, wherein the block assignment part assigns 12 successive mRBs to the subframes.

10. The apparatus of claim 9, wherein the shifting part calculates a floor function of a value obtained by dividing 12 by the number of dedicated subchannels included in the slot, and multiplies the index minus 1 by the floor function, divides the resultant value by 12, and leaves the remainder as the number of cyclic shifts to cyclically shift the mRBs.

11. The apparatus of claim 7, wherein the dedicated channel comprises a plurality of dedicated subchannels, the dedicated subchannels comprise a plurality of mRBs, and
    some mRBs included in some of the dedicated subchannels are assigned for the subframes.

12. The apparatus of claim 7, wherein the frames are included in a superframe, and
    the superframe comprises a first slot and a second slot, the first slot comprises four dedicated subchannels, and the second slot comprises five dedicated subchannels.

* * * * *